United States Patent [19]
Park et al.

[11] Patent Number: 5,639,805
[45] Date of Patent: Jun. 17, 1997

[54] PROCESS FOR PREPARING CORE-SHELL EMULSION POLYMER PARTICLES AND RESULTING PRODUCT CONTAINING SUCH PARTICLES

[75] Inventors: Jong Myung Park, Seoul; Sang No Han; Bok G. Won, both of Suwon, all of Rep. of Korea

[73] Assignee: Korea Chemical Co., Ltd., Kyunggi-do, Rep. of Korea

[21] Appl. No.: 570,380

[22] Filed: Dec. 11, 1995

Related U.S. Application Data

[63] Continuation of Ser. No. 289,615, Aug. 12, 1994, abandoned, which is a continuation of Ser. No. 987,732, Dec. 8, 1992, abandoned.

[30] Foreign Application Priority Data

Dec. 13, 1991 [KR] Rep. of Korea ............... 91-22946

[51] Int. Cl.$^6$ ...................................... C08L 33/02
[52] U.S. Cl. .................. 523/201; 523/218; 524/251; 524/379; 525/902; 528/495; 528/496
[58] Field of Search ............... 523/201; 525/218, 525/902; 526/80; 524/251, 379; 528/495, 496

[56] References Cited

U.S. PATENT DOCUMENTS

| | | |
|---|---|---|
| 3,637,431 | 1/1972 | Brenneman. |
| 3,669,729 | 6/1972 | Seiner. |
| 3,804,881 | 4/1974 | Bassett. |
| 3,891,577 | 6/1975 | Kershaw. |
| 3,928,273 | 12/1975 | Chang et al. ............... 524/555 |
| 4,039,500 | 8/1977 | Bassett et al. ............... 526/80 |
| 4,150,005 | 4/1979 | Gehman et al. ............... 523/201 |
| 4,427,836 | 1/1984 | Kowalski. |
| 4,594,363 | 6/1986 | Blankenship et al. ............... 523/201 |
| 4,880,842 | 11/1989 | Kowalski et al. ............... 521/64 |
| 5,273,824 | 12/1993 | Hoshino et al. ............... 525/902 |

*Primary Examiner*—Andrew E. C. Merriam
*Attorney, Agent, or Firm*—Lowe, Price, LeBlanc & Becker

[57] ABSTRACT

The present invention relates to a process for preparing polymeric particles which is specially designed to be served as an opacifying agent in coating compositions such as water-borne paints, paper coating compositions and molding compositions which have white or light color shades. In more detailed description, this invention is concerned with the process for making an aqueous dispersion of core-shell emulsion polymer particles comprising (1) preparing the core by polymerizing carboxylic acid monomers with other monoethylenically unsaturated monomers, (2) encapsulating said core with a rigid polymer shell by polymerizing shell-forming monomers, in the presence of said core particles, which are fed in such manner that compositional contents of monomers entering to a polymerization zone is changing gradually thoughout the period of monomer feeding, and (3) neutralizing with base so as to swell said core and form particles which, when dried, contain at least one void.

12 Claims, No Drawings

PROCESS FOR PREPARING CORE-SHELL EMULSION POLYMER PARTICLES AND RESULTING PRODUCT CONTAINING SUCH PARTICLES

This application is a continuation of application Ser. No. 08/289,615 filed Aug. 12, 1994, now abandoned, which is a continuation of application Ser. No. 07/987,732, filed Dec. 8, 1992, now abandoned.

FIELD OF THE INVENTION

The present invention relates to a process for preparing polymeric particles which is specially designed to be served as an opacifying agent in coating compositions such as water-borne paints, paper coating compositions and molding compositions which have white or light color shades. In more detailed description, this invention is concerned with the preparation and use of emulsion polymer particles which were made by multi-stage emulsion polymerization and generating a microvoid inside of a particle when dried.

BACKGROUND OF THE INVENTION

It is well-known in paint industry that the so-called plastic pigment has played an important role to reduce the cost of high quality water-borne paints without sacrificing performance by replacing part of titanium dioxide which has been mainly used as a white pigment. In general, the methods to increase the hiding power of paint film can be devided into two categories; one is based on the use of the open cell of microvoids and the other is based on the use of the closed cell of microvoids. The typical example of utilising microvoids of open cell type may be seen in the water-borne paints of low-cost and low quality, in which the pigment volume concentration of the paints are formulated above a critical pigment volume concentration by highly loading the so-called extender and hence the hiding power of the paint film are increased by the formation of interfaces between pigment and air instead of interfaces between pigment and binder. Regardless of the increased hiding efficiency this method suffers from inferior gloss and relatively poor resistances to water, soap solution and stain because of the presence of the connected large voids in the dried film.

In order to overcome the problems mentioned above, fine non-film forming emulsion polymer particles whose glass transition temperature is above 40° C. and particle size is below 1.0 micron, e.g., polystyrene latexes, are formulated into the water-borne paint to reduce the size and quantity of continuous voids and to improve water resistance and washability with the help of the coalescing solvent added to partly sinter the non-film forming particles. However, this method also suffers from the fact that the hiding power of the paint films can not be maximized because of the lack of ability to scatter light rays by the emulsion polymer particles which has almost same reflectivity as that of film-forming latex binder.

Recently a number of approaches to incorporating microvoids of closed cell type into paint films have been suggested. One of these is the use of organic solvent which was embodied in U.S. Pat. No. 3,669,729. More specifically, the patent discloses the use of non-solvent entrapped film-forming latex binders as the main binder for latex paints whose dried film would be cellular form upon evaporation of the non-solvent and hence has an increased hiding power. However, despite of the improvement of hiding power, this method also suffers from such drawbacks as the complication of the process, poor storage stability, poor reproducibility of hiding power and the less environmental friendliness. A similar method was proposed in U.S. Pat. No. 3,637,431, in which non-film forming emulsion polymers emulsified with the organic solvent, immiscible with aqueous phase, were used to provide microvoids into the dried film, but it also suffered from the problems afore mentioned.

In order to overcome such problems a new method was proposed in recent years, in which microvoid-containing polymer particles were made in seperate process and blended into water-based coatings resulting in achieving more reliable opacifying method. Kershaw et. al, in U.S. Pat. No. 3,891,577 disclose preparation of vesiculated polymers by emulsion polymerization of a liquid medium which is obtained by the so-called double emulsification method, that is, emulsifying a water in oil emulsion, for example, the unsaturated polyester dissolved in styrene monomer containing water dispersed therein into water medium to become a water in oil in water emulsion and thus, by polymerizing such emulsion, obtaining polymer beads having 1 to 25 microns of diameter and several tiny water droplets inside of each bead. Whereas this material can play a better role as an opacifying pigment than polystrene solid particles because it has a hiding power itself, it is difficult for this material to have a contribution as the so-called spacer between $TiO_2$ particles because this material is not able to be produced as submicron sized due to an inherent nature of emulsification method carried out by mechanical stirring, and also this material has a problem of settling during storage and in addition it can not afford to be applied in the field of glossy coating compositions.

In recent years in order to overcome the problems mentioned previously, a new preparation method has been developed where microvoid-containing polymer particles were prepared by sequentially emulsion polymerizing a core monomer system to be the alkali-swellable polymer core, polymerizing in the presence of the core polymer dispersion a shell monomer system, and neutralizing with ammonia or base so as to swell said core and form particles which, when dried, contain a single closed cell of void. The efficiency of the so-called core-shell emulsion polymerization may be depending on several factors such as monomer compositions of each stage of polymerization, glass transition temperature of the polymer, the kinds and concentration of surfactants, the kinds and concentration of initiators and polymerization temperature. For example, if the core polymer formed in the first stage is more hydrophilic than the shell polymer formed in the subsequent stage, the polymer particles finally obtained may have an inverse core-shell morphology or so-called confetti-like structure regardless of the order of monomer addition. To avoid the formation of undesirable particle morphology it has been suggested that a multi-stage emulsion polymerization process should be controlled in optimum way.

According to U.S. Pat. No. 427,836, after making a hydrophilio polymer containing carboxylic acid group, which can be expanding more than 2 times in volume when neutralizing with aqueous solution of volatile base, in first stage of emulsion polymerization, there has been used a method to form the shell on the surface of the hydrophilio core polymer with the polymeric material which is permeable to aqueous base solution by a thermal or redox emulsion polymerization process. In the said invention it was disclosed that the core polymer contains at least 5%, preferably at least 10%, by weight of acid monomers and the shell polymer contains less than 10%, preferably not over 5%, by weight of acid monomers, and that the ratio of core weight to the total weight is from 1:4 to 1:100. It was also disclosed that the shell polymer was not permeable to aqueous inorganic base at 20° C., and was not able to form a continuous film at room temperature even in the presence of small amount of coalescing agents because its Tg is considerably higher than 40° C.

To obtain this particular partiole morphology as designed, empolyed was multi-stage emulsion polymerization process where monomers were fed in a preemulsified form under the condition of minimum level of concentration of conventional emulsifier. Because the internal structure of emulsion polymer was controlled by the concentration of the emulsifier in this case, it is difficult to accomplish the polymerization stability and the supression of generation new crop of secondary particles simultaneously. Because the shell-forming monomers are used at least 4 times, preferably 8 times, as such as the core-forming monomers in order to get the concentric core-shell particle structure, the wall of the hollow polymer particles is inevitably thicker than it may be needed.

To solve this problem, in Korea Patent No. 25,024, it was suggested that the copolymerizable surfactant is used as emulsifier to get better water resistance, and that a monomer feed rate, the kinds of polymerizing initiator and the reaction temperature are carefully chosen so as to suppress the formation of abnormal particles during a shell-forming stage and to get a desired particle morphology reproducibly without sacrificing a polymerization stability. It was claimed in the said invention that the concentric core-shell structured latex particles are obtained with using relatively less amount of the shell monomer compared to the method proposed by Kowalski et.al, in U.S. Pat. No. 4,427,836, because it provides higher encapsulation efficiency of the shell polymer on the core particle through suppressing the formation of abnormal particles.

Although the said methods can be used to produce aqueous dispersion of composite latex particles which have the alkali-swellable polymer as core and more hydrophobic polymer as shell, those suffer from the fact that, during drying, particles are collapsed especially when the strength or thickness of polymer wall is not sufficient enough to withstand the contraction force generated by the evaporation of water and the restoration of the swellen core polymer. Such formation of abnormal collapsed particles decreases their hiding efficiency by reduction of the volume of internal void and also restricts paint formulation due to the increases of the oil absorption amount and the binder demand of particles because of unnecessary increase of surface area of particles resulted from a non-spherical particle geometry. To solve this problem, methods employed are to thicken the shell layer of particles by increasing the ratio of shell-forming monomer to core-forming monomer and to prevent the particle collapse by increasing the strength of wall incorporating a proper amount of crosslinking monomer in a mixture of shell-forming monomer, but those are not able to maximize the hiding efficiency per unit weight of particles by unnecessary increase of a wall thickness.

SUMMARY OF THE INVENTION

Thus the purpose of this invention is to provide the method to produce the composite emulsion polymer of alkaline-swelling polymer core/hydrophobic polymer shell which can endure the contraction force during drying with a minimum thickness. The reduction of a wall thickness of hollow polymer particles is technically important because it contributes to a cost-reduction by decreasing the amount of polymeric material used. According to conventional production methods, semibatch processes have been used, in which, after polymerizing core-forming monomers containing acid-mer and comonomers, shell-forming monomers fed with constant speed as itself or as preemulsified are polymerized in the presence of the core particles.

The composite latex particles produced by such a two-stage emulsion polymerization have a well-defined two-layer structure, like a well-done egg, having uniform chemical compositions. Glass transition temperature has been regarded as the only criterion for selecting a shell-forming polymer in the said method as measure of the softening temperature of polymer and hence there is used a mixture of shell monomers whose Tg is at least 40° C., preferably at least 80° C., to endure the contraction force generated during drying process at ambient temperature. However, in the present invention, the toughness index is also regarded, besides Tg, as the criterion for selecting such a shell-forming polymer. The term "toughness index" expressed numerically refers to how tensile stress of polymeric material responds to the imposed tensile strain, and, according to S. Wu in Journal of Applied Polymer Science Vol. 20, 327(1976), it is defined as a function of glass transition temperature (Tg) and brittle-ductile transition temperature (Tb) as follows:

$$\text{Toughness Index} = \frac{Tg - Tb}{Tg}$$

For example, if comparing polystyrene with polymethylmethacrylate, even though the glass transition temperature of the former is quite similar to that of the latter, specifically 100° C. and 105° C., respectively, the tough index of the former is quite lower than that of the latter, that is, 0.027 and 0.159, respectively, because the brittle-ductile transition temperature of the former is much higher than that of the latter, 90° C. and 45° C., respectively.

Therefore, because, although the glass transition temperature of two polymers are much the same, they are quite different in mechanical strength, the toughness index should be taken into consideration together with the the glass transition temperature when designing the structured latex as is the case in the present invention. Polymethylmethacrylate is more suitable than polystyrene as a uniform shell polymer of the core-shell structured latex particles because of having a higher toughness index. The toughness index is determined solely by a monomer composition in a homogeneous system like the polymer solution, whereas it is depending on not only a monomer composition but also the interior structure of particles in a heterogeneous system, e.g., latex polymers.

The important embodiment of this invention is to increase the toughness index of the shell polymer of the hollow polymer particles by making the structure of latex particles of being heterogeneous in order to enhance the mechanical properties of the homogeneous particles. As mentioned above in the case of core/shell polymers of discrete two-layer structure produced by conventional process, the collapse and deformation of particles during drying is governed by the mechanical properties of the homogeneous shell polymer. Therefore, the polymer particles composed of conventional radical polymers can be preserved from the deformation when the thickness of the polymer wall exceeds at least 20% of an entire particle diameter, whereas the polymer particles having a spectrum-like shell structure disclosed in the present invention can be preserved from the deformation even when the shell thickness is less than 20 percent of an entire particle diameter. The term "spectrum-like" structure defines that in which the change in molecular structure in the particle is one such as is represented by the gradual, consistent and even change observed in a spectrum.

In this invention, the core particles are prepared by the conventional emulsion polymerization, and then the emulsion polymer having the spectrum-like shell structure is produced using a feed method of gradually changing the composition of monomer mixture, that is, monomer mixture is fed into a reactor by gradually changing the composition of the shell-forming monomer mixture from the beginning to the end of the shell-forming stage. The similar instance in which the mechanical properties of the latex particles were improved by introducing the effect of particle structure using a feed method of the so-called "continual change in monomer composition" is reported in "Emulsion Polymers and Emulsion Polymerization, ACS Symposium Series 165, P. 371(1981)" by D. R. Bassett and K. L. Hoy. Hereto they found that the toughness index of 50/50 MMA/EA copolymer latexes can be varied drastically according to the particle morphology, for example, the toughness index of the homogeneous single staged latex was 0.9, but that of the heterogeneous one having hard core gradually changing to a soft exterior was 1.9. Though a spectrum-like morphology of single staged latexes was disclosed in U.S. Pat. No. 3,804,881 and in U.S. Pat. No. 4,039,500 to improve mechanical properties and film-forming ability, respectively, but nobody has yet applied it for designing two-staged or multi-staged latexes, especially for preparing hollow polymer particles. For easier and better understanding of the polymerization process disclosed in the present invention, the simplest example in which monomer A is copolymerized with B is described below.

In the conventional polymerization method, monomer mixture of A and B is supplied into a reactor from a monomer feed tank through a certain period with a predetermined feed rate, whereas in the polymerization method of this invention, the each monomer, A and B, stored in two separate tanks is simultaneously fed into a reactor and hence the composition of monomer mixture entering into the reactor is varying with time because the feed rate of each monomer is changed gradually and seperately. For instance, when the feed rate of monomer A is increased from 0 in the very early stage to 100 in the end of feeding and at the same time that of B is decreased from 100 to 0, specially structured latex particles having the copolymer abundant in B in the interior of particle and that rich in A in the surface of particle may be consequently produced. As aforesaid, by varying feed rates of each feed tank which is directly connected to a reactor, monomer compositions entering in the reactor can be controlled as desired. However, such gradual change of monomer composition can be more easily achieved by connecting the two feed tank in a row to the reactor and introducing monomer mixture in the near tank to the reactor simultaneously with the addition of the monomer mixture in the far tank to the near tank. During the simultaneous flows from the far tank to the near tank and from the near tank to the reactor there is continual variation in the compositional content of monomers in the near tank and consequently the composition of incoming monomer to the reactor is as follows:

$$C_1 = C_2^0 - (C_2^0 - C_1^0)(1-\alpha)^x$$

Where $C_1^0$ and $C_2^0$ is the initial monomer composition of the near and far feed tank, respectively, and $\alpha$ is the conversion ratio or the feed monomer ratio and x is the ratio of the monomer amounts in the two feed tanks. Accordingly, the simplest instance where each of two feed tanks is connected directly to the reactor and the feed rate of monomer A is increased from 0 to 100 and simultaneously that of monomer B is decreased from 100 to 0 can be more conveniently duplicated by means of the so-called "simultaneous monomer flows in a row" in which x is 1, $\alpha$ is 0.5, and $C_1^0$ is 100% of B monomer, $C_2^0$ is 100% of A monomer.

Though the feed method of continual change in monomer composition was described with simplest case, the variations in feed rate and in arrangements of feed tanks are practically innumerable. Hitherto it was explained assuming that the composition of polymer produced in the reactor should reflect the composition of monomer entering the reactor. In an important embodiment of the process of this invention, the polymerization system is at any instant kept under the monomer starved condition, by controlling the monomer feed rate and other polymerization conditions appropriately, which means there is no significant time delay between introduction of monomers to the reactor and essentially complete polymerization of the monomers and hence there is no cumulation of any specific monomer in the polymerization zone even when mixtures of monomers of quite different reactivity ratios and water solubilitie are employed. Therefore, in this invention, the polymerization rate and the monomer addition rate should be controlled so that the instantaneous conversion is at least 70 percent, preferably at least 65 percent at any time in the shell-forming stage.

Hereinafter another embodiment of this invention is described. When a specific monomer even if its toughness index is low must be used essentially for the cost-down or for an easier particle morphology control, this invention is applied usefully, too. For example, when styrene should be used as a shell-forming monomer, the wall of polymer produced should be thick because of poor mechanical strength of styrene whose toughness index is 0.027. But by using the process of this invention, the wall thickness may be reduced effectively by the introduction of suitable comonomer such as acrylonitrile or methylmethacrlate to make a spectrum-like shell polymer structure.

In this invention, in order to enhance the toughness index introduced is not only a heterogeneity of the particle structure with respect to the change in monomer composition but also a heterogeneity of crosslinking degree inside latex particles. Using the feed method of continual change in composition, the strength of shell polymer can be maximized by providing the concentration gradients of monomer composition as well as crosslinking degree in the shell layer. The crosslinkable monomers may be present in the both tanks or either in the near or in the far feed tank, more preferably in the far feed tank, the proportion thereof being in the range of 0.01 to 5.0%, preferably 0.05 to 1.0%, by weight, based on the total monomer weight of the shell. Examples of the crosslinkable monomers include divinyl benzene, allyl (meth)acrylate, tripropylene glycol di(meth) acrylate, diethylene glycol di(meth)acrylate, ethylene glycol di(meth)acrylate, 1,6-hexanediol di(meth)acrylate, 1,3-butylene glycol di(meth)acrylate, and trimethylolpropane tri(meth)acrylate.

DETAILED DESCRIPTION

Hereinafter the present invention is explained in detail stage by stage of polymerization process.

In accordance with the present invention, the preparation of core-shell polymer particles which are useful for opacifying agents in coating compositions is composed of (1) producing ionic core polymer particles by copolymerizing acid monomers containing a carboxylic group with common monomers, (2) encapsulating the core polymer with the hard and rigid polymer sheath by polymerizing shell-forming monomers with the feeding method of continual change in the monomer compositions in the presence of the preformed core particles, and (3) neutralizing and expanding the produced core-shell composite polymer particles with base at elevated temperature, and generating inner void when dried.

The said core particles may be prepared in single polymerization stage or preferably prepared in plural stages containing a preparing stage of seed polymer and followed by the making of the shell to control more easily the particle size and its distribution of final latex and the void size and its distribution. Hence the first stage of emulsion polymerization in the process may be the preparation of a seed polymer, which may or may not contain as one component thereof any acid monomer but provides particles of minute size which form the nuclei on which the acid monomer mixture is polymerized in a sequential stage and which has an average particle diameter in the range of about 0.02 to about 0.5 micron, preperably 0.03 to 0.2 micron. Suitable acid monomers include acrylic acid, methacrylic acid, itaconic acid, crotonic acid, fumaric acid, aconitic acid, maleic acid or anhydride, monomethyl maleate, monomethyl fumarate, and monomethyl itaconate. An acid monomer or mixture of acid monomers is copolymerized with one or more of comonomers, the proportion of acid monomer being 0 to 10%, preferably 0 to 5%, by weight based on the total monomer weight. The ethylenically unsaturated monomers copolymerized with acid monomer include styrene, vinyltoluene, ethylene, butadiene, vinylacetate, vinyl chloride, vinylidene chloride, acrylonitrile, alkyl acrylate, and alkyl methacrylate. Any nonionic or anionic emulsifier may be used, either alone or together, in an amount of about 0.1 to 2.0%, by weight, based on the total monomer weight. Examples of the nonionic type of emulsifier include octyl phenoxy ethyl polyethoxyethanol and nonyl phenoxy ethyl polyethoxyethanol. Examples of anionic emulsifiers include sodiumlaurylsulfate, sodium dodecyl benzenesulfonate, sodium octyl phenoxy ethyl polyethoxyethyl sulfate, and sodium salt of sulfosuccinate derivatives.

As in common in emulsion polymerization, there is used a water soluble free radical initiator, such as alkali metal persulfates, ammonium persulfate, hydrogen peroxide and tertiarybutylhydroperoxide, or a mixture of such an initiator with a reducing agent, such as an alkali metal sulfite, hyposulfite or sodiumformaldehydesulfoxylate, to form a redox system. The amount of initiator may be from 0.1 to 2% by weight of the monomer, and the reaction temperature may be in such that the decomposition half-life time of the initiator used is from 30 to 300 minutes.

For instance, in the case of a ammonium persulfate, potassium sulfate or sodium persulfate, being used alone, the temperature is preferably in the range of 60° C. to 90° C., whereas in the case of a mixture of a sodium bisulfite or sodium formaldehyde sulfoxylate with the sulfate initiators, the temperature is preferably in the range of 30° C. to 60° C. As is common to emulsion polymerization, the criteria for the selection of initiator and reaction temperature are applied to the subsequent core-forming and shell forming stages as well.

After the seed polymer is formed, a subsequent stage is carried to form core polymers using hydrophilic monomers. The core polymer may contain as components thereof about 15 to 60% by weight of acid monomers, 39 to 85% by weight of monoethylenically unsaturated monomers, and about 0 to 2% by weight of a crosslinkable monomer. Examples of the respective monomers are mentioned above. The amount of the core monomer may be 2 to 40 weight % based on the total weight of the monomer mixture irrespective of the presence of a seed stage, and if the core is obtained from a seed polymer, it may be used about 4 to 20 times as much as the seed-forming monomer. The suitable rate of monomer addition may be in the range of 30 minutes to 3 hours, which should be determined by carefully considering its effects on the polymerization stability, the control of heat generated, and the behavior of particle growth. The amounts of emulsifier and initiator, and reaction temperature of the core-forming stage should be designed so as for the particle diameter of the polymer obtained to be in the range about 0.1 to 0.5 micron in unswellen state, that is, before any neutralization to raise pH to above 5.

The subsequent stage of forming a shell polymer on the core polymer particles will be effected in another reactor by transferring the core polymer stored in shelf or preferably in the same reactor where the formation of the core was accomplished. The mixture of monomers used in shell-forming stage consists of 95 to 100%, by weight, of one or more of monoethylenically unsaturated monomers and 0 to 5%, by weight, of acid monomers. As described above, glass transition temperature and toughness index should be regarded as the criteria for the monomer selection. Emulsifier and initiater are selected among those mentioned hereinbefore and the amount of emulsifier to be used should be controlled in the range of 0.01 to 2.0%, by weight, based on the monomer weight to accomplish a good polymerization stability as well as a desirable particle growth behavior at once. In an embodiment of this invention, whether the shell polymer is formed in a single stage or in a plurality of stages, at least one shell-forming stage should be performed with the monomers being fed in the manner of the so-called "continual change in composition" but preferably it is composed of a first shell-forming stage with a regular monomer feeding and a 2nd shell-forming stage with the continual change in feed composition. In such case, the process of neutralization necessary to prepare microvoid may be performed after the first-shell polymer is formed. The neutralization temperature should be selected by considering glass transition temperature of the first-shell polymer in order to get the maximum expansion of the entire particle along with shell layer, preferably being at 50°–100° C. For the operational convenience, it is more desirable to carry out the neutralization stage at a given polymerization temperature, without changing the temperature, and hence it should be considered its relation with polymerization temperature. Because, in the sequential emulsion polymerization composed of core—the first shell—neutralization—the second shell, the major roles of the first shell polymer are to prevent drastic increase of viscosity which may occur during the neutralization of core particles and to maintain the encapsulation efficiency of the second shell polymer, by providing polymer barrier, even after neutralization which generally decreases encapsulation efficiency because of forming much more hydrophillic surface by the dissociation of carboxyl group, the mixture of acrylic monomers of intermediate chemical properties may be used as the first shell monomers and the ratio of the core weight to the first shell weight is from 1:1 to 1:50, preferably 1:1 to 1:8. Because the major role of the second shell polymer is to prevent the deformation of particles during drying process, it is proposed in this invention that the emulsion polymerization should be carried out with feeding the mixture of monomers having the proper toughness index in the manner of the continual change in composition and that the ratio of the first shell polymer to the second shell polymer should be from 1:1 to 1:100, preferably 1:1 to 1:50.

In such feeding method, concentration of a certain monomer will vary linearly with time when the volume of monomer present in the two feed tanks is same, whereas, when it is not, it will vary non-linearly with time. For instance, if the ratio of the volume of monomer present in the far tank to that in the near tank is more than 1, the concentration curve may have a convex type curvature, whereas, if it is less than 1, it may have a concave type curvature when plotting the concentration vs. time. As described above, the criteria for selecting monomers to be used in the 2nd shell-forming stage include glass transition temperature and toughness index. Generally glass transition temperature is at least 30° C., perferably at least 50° C., and toughness index is at least 0.04, preferably at least 0.08. For example, in the case of using styrene as main monomer, alkyl(metha)acrylate or the like may be mixed in the range of 5 to 50% by weight to increase toughness index of polymer formed preferably. More specifically, the 2nd shell-forming stage may be designed so as to produce a polymer having glass transition temperature of 54° C. and toughness index of 0.09, when 100 parts of a 60/40 styrene /butylacrylate mixture is present in the near tank and 100 parts of styrene is present in the far tank.

In the case of introducing crosslinking monomer to increase the toughness of the 2nd shell, it may be added either equally to both feed tanks without having any concentration gradient or preferably to anyone of feed tanks to have the concentration gradient whether linear or not.

Base used in neutralization stage may be either volitile base such as ammonia and the tertiary amine, or alkali metal hydroxide such as sodium hydroxide and potassium hydroxide. When it is added, pH of emulsion polymeric dispersion is preferably in the range of 7 to 12 after neutraization. To help the base permeate into particles, organic solvent may be added either at neutralization, or before or after neutralization.

Solvent should have more chemical affinity to core polymer than to shell polymer and have a certain degree of water solubility. For instance, one or more of alcohols chosen among ethanol, propanol, hexanol, and TEXANOL (2,2,4-trimethyl-1,3-pentanediol mono(2-methylpropanoate)) may be used in the range of about 2–100% by weight based on the core polymer weight.

The particle diameter of the emulsion polymer prepared by the process in the present invention may be in the range of 0.1 to 2.0 micron, preferably 0.2–1.0 micron, and the diameter of void after dried may be in the range of 0.05 to 1.5 micron, preferably 0.1 to 0.8 micron. Because the collapse or deformation of particles during drying is not observed even when the ratio of wall thickness to the entire particle diameter is relatively low, the composite polymer particles prepared by the process in the present invention may more effectively and economically serve as an opacifying agent for latex paints and paper coatings than conventional counterparts. Therefore, when compared opacity of the films which have been made by drying of draw-downs of a blend of a film-forming acrylic latex with the alkali-swellen composite polymer latexes in a ratio of 7:3 by weight, it was found that the product produced by the process of the present invention was superior to conventional opaque polymers because of thinner wall and consequently of higher void volume concentration at the same solid content.

EXAMPLE 1

To a 1-liter 4-neck round-bottomed flask equipped with a paddle stirrer, thermometer, dropping funnel, nitrogen inlet and reflux condenser is added 400 g of deionized water, 0.5 g of sodium bicarbonate and 0.5 g of sodium dodecylbenzene sulfonate and then heated to 80° C. under a nitrogen atmosphere and followed by the addition of 0.45 g of sodium persulfate dissolved in 30 g of water. While the temperature is maintained at 80° C. a monomer emulsion consisting of 40 g of deionized water, 0.05 g of sodium dodecylbenzene sulfonate, 52 g of butyl acrylate, 66 g of methyl methacrylate and 1.4 g of methacrylic acid is added to the flask over an hour period. After the completion of the monomer feed, the dispersion is held at 80° C. for 1 hour and cooled to room temperature. Upon examination with a light scattering method, the average particle diameter of this dispersion is found to be 43 nm and its solid content is 19.7%.

To 1010 g of deionized water and 30 g of the acrylic seed polymer dispersion in a 2-liter 4-neck flask heated to 80° C., there is added 2.0 g of sodium persulfate dissolved in 50 g of water. While the temperature is maintained at 80° C., a monomer emulsion consisting of 115 g of deionized water, 0.5 g of sodium dodecylbenzene sulfonate, 190 g of methyl methacrylate, 105 g of methacrylic acid and 1.5 g of ethyleneglycol dimethacrylate is added to the flask over 2 hour period. After the completion of the monomer feed, the dispersion is held at 80° C. for an hour and then cooled to room temperature to obtain core polymer latex. The product has average particle diameter of 162 nm(light scatter) and 22.8% total solids.

720 g of deionized water and 160 g of the acrylic core polymer latex are charged into a 2-liter 4-neck flask and heated to at 80° C. and followed by the addition of 0.87 g of sodium persulfate dissolved in 25 g of water. A monomer emulsion consisting of 220 g of deionized water, 20 g of styrene, 83 g of methyl methaorylate, 42 g of butyl acrylate, 3.5 g of sodium dodecylbenzene sulfonate and 2.2 g of Triton X-100 (Rohm & Haas product) is added to the flask over 2 hour period at 80° C. After the completion of the monomer feed, the dispersion is held at 80° C. for 1 hour. The dispersion is neutraized to pH 11.0 with aqueous ammonia solution and held at 80° C. for 1 hour. The average particle diameters are 280 nm and 430 nm before and after the neutralization, respectively, and its solid content is 14.4%. 1.74 g of sodium persulfate dissolved in 20 g of water is added to the flask while maintaining temperature at 80° C.

There is charged to a near dropping funnel 45 g of butyl acrylate, 32 g of methyl methacrylate and 68 g of styrene and charged to a far dropping funnel 10 g of methyl methacrylate, 22 g of butyl acrylate and 113 g of styrene. The contents of the near funnel is fed into the flask at a rate of 2.2 cc/min while simultaneously introducing into the near funnel from the far funnel the contents of said far funnel at a rate of 1.1 cc/min for 90 minutes. After completion of the monomer feed, the dispersion is held at 80° C. for an hour and then cooled. At 55° C. during cooling down, 0.4 g of sodium formaldehyde sulfoxylate and 0.3 cc of t-buthy hydroperoxide(70%) dissolved in 10 g of water are added.

The dispersion have solid content of 28.9% and viscosity of 190 cps. Upon examination with a Transmission Electron Microscope the average particle diameter and the average microvoid diameter of the final dispersion polymer is found to be 484 nm and 340 nm, respectively.

EXAMPLE 2

160 g of the core polymer dispersion which was prepared with the same procedure described in Example 1 and 720 g of deionized water charged into a 2-liter flask were heated to 80° C. and then added 0.87 g of sodium persulfate dissolved in 25 g of water. While the temperature was maintained at 80° C., a monomer emulsion consisting of 220 g of deionized water, 15 g of styrene, 62 g of methyl methacrylate, 32 g of butyl acrylate, 3.0 g of sodium dodecylbenzene sulfonate and 1.90 g of triton X-100 was added to the flask over 2 hour period. An hour after the completion of the monomer addition, the dispersion was neutralized to pH 11.0 with aqueous ammonius solution and was stirred for an additional hour at 80° C., and then 1.52 g of sodium persulfate dissolved in 20 g of water was added. There was charged to a near dropping funnel 34 g of butyl a crylate, 24 g of methyl methaorylate, 51 g of styrene and 1.2 g of ethyleneglycol dimethoacrylate and charged to a far dropping funnel 23 g of butyl acrylate, 8 g of methyl methacrylate, 85 g of styrene and 0.6 g of ethyleneglycol dimethacrylate. The contents of the near funnel was fed into the flask at a rate of 2.2 cc/min while simultaneously introducing into the near funnel from the far funnel the contents of said far funnel at a rate of 1.1 cc/min. The rest of the process was same as in Example 1. The product has a solid content of 25.0%, viscosity of 195 cps, an average particle diameter of 460 nm, and an average void diameter of 349 nm.

EXAMPLE 3

The procedure described in Example 2 was followed. The example differs from Example 2 in that the mixture of 8 g of n-butanol and 8 g of n-hexanol was added during neutralization. The final emulsion product had a solid content of 24.7% and viscosity of 360 cps. An average particle diameter was 461 nm and an average void diameter was 353 nm.

EXAMPLE 4

The procedure described in Example 2 was followed until the neutralization stage. The example differs in the composition and weight ratio of the monomer mixture present in each feed tank during the 2nd shell-forming stage, 23 g of butyl acrylate, 16 g methacrylate, 34 g of styrene and 0.6 g of divinyl benzene were charged in a near dropping funnel and 21.3 g of butyl acrylate, 10.7 g of methyl methacrylate, 113 g of styrene and 1.2 g of divinyl benzene were charged in a far dropping funnel. The contents of the near funnel was fed into the flask at a rate of 2.2 cc/min while simultaneously introducing the contents of the far funnel from the far funnel into the near funnel at a rate of 0.73 cc/min. The rest of the process was same as in Example 1. The emulsion product had 24.9% total solids and 230 cps viscosity. The average particle diameter was 456 nm and the average void diameter was 345 nm.

EXAMPLE 5

The procedure described in Example 2 was followed until the nutralization stage. The example differs in the composition and weight ration of the monomer mixture present in each feed tank during the 2nd shell-forming stage 34.3 g of butyl acrylate, 18.7 g of methyl methacrylate, 92 g of styrene and 1.5 g of divinyl benzene were charged in a near dropping funnel and 10 g of butyl acrylate, 8 g of methyl methacrylate, 55 g of styrene and 0.3 g of divinyl benzene were charged in a far dropping funnel. The contents of the near funnel was fed into the flask at a rate of 2.2 cc/min while simultaneously introducing the contents of the far funnel from the far funnel into the near funnel at a rate of 1.46 cc/min. The rest of the process was same as in Example 1. The emulsion product had a globular shape, and 24.8% total solids and 260 cps viscosity. The average particle diameter was 460 nm.

COMPARATIVE EXAMPLE 1

For the purpose of comparision with Example 1, the procedure described in Example 1 was followed. This example differs from Example 1 in that single feed tank was employed during second-shell formation. The monomer mixture consisting of 67 g of butyl acrylate, 42 g of methyl methacrylate and 181 g of styrene was added to a flask at a rate of 2.2 cc/min for 90 minutes. The final emulsion product has a solid content of 29.6%, viscosity of 445 cps, and average particle diameter of 490 nm. It was observed under electron microscope that most particles were collapsed.

COMPARATIVE EXAMPLE 2

In order to compare with example 2, the same monomer composition as in Example 2 was used during second-shell formation. In this example, a single feed tank was used. The monomer mixture cosisting of 50 g of butyl acrylate, 32 g of methyl methacrylate, 136 g of styrene and 1.8 g of ethyleneglycol dimethacrylate was injected to a flask at a rate of 2.2 cc/min. The final emulsion product has 24.8% total solids, 441 nm average particle diameter and viscosity of 270 cps. It was ovserved that most particles were collapsed.

COMPARATIVE EXAMPLE 3

This comparative example was performed to compare it with Example 4. The monomer mixture consisting of 44.3 g of butyl acrylate, 26.7 g of methyl methacrylate, 147 g of styrene and 1.8 g of divinyl benzene was gradually supplied to a flask at the same time feed rate as in Example 4. The product has a solid content of 24.7%, viscosity of 220 cps, an average particle diameter of 460 nm. Most particles were found to be collapsed.

COMPARATIVE EXAMPLE 4

The same recipe and procedure were used as in Comparative Example 3, only 219.8 g of styrene monomer being used as a 2nd-shell forming monomer. The final emulsion product has 24.9% total solids, average particle diameter of 465 nm and 380 cps viscosity. Most of particles were in a deformed shape.

COMPARATIVE EXAMPLE 5

The styrene was used as a second shell-forming monomer as is the case in Comparative Example 4. This example differs from Comparative Example 4 in that an amount of styrene used is increased three times and deionized water is added for prepaing latex of same solid content. The final emulsion polymer has an average particle diameter of 526 nm, 24,8% total solids, and viscosity of 106 cps. Deformation of particles was not observed under electron microscope.

APPLICATION EXAMPLE 1

In order for compare opacifying efficiencies of the swollen core/shell polymer dispersions prepared in Example 1 to 5 and Comparative Example 1 to 5, a blend of each of the said core/shell polymer dispersion and a commercially available film-forming latex(H5250-Korea Chemical Co.) was made (30% core/shell polymer based on a solid weight) and was drawn down over an opacity chart with a Bird applicator. The wet films of thickness of 3 mil were dried at ambient temperature. The Kubelka-Munk scattering coefficients (S) were measured by the method of K, Nyi, Australian OCCA Proceedings and News, Nov. 1982, P. 4–13.

Table 1 reports the results of varying the monomer composition and feeding method of the second shell stage on the film opacity for core/shell particles prepared using the processes of Example 1 to 5 and Comparative Example 1 to 5.

TABLE 1

| | Monomer Composition*[1] | Compositional gradient (order)*[2] | Film Opacity*[4] (S/mil) |
|---|---|---|---|
| Example | | | |
| 1 | BA/MMA/ST*[3] = 37/23/100 | 1 | 0.38 |
| 2 | BA/MMA/ST/EGDMA = 28/18/75/1 28/18/75/1 | 1 | 0.46 |
| 3 | BA/MMA/ST/EGDMA = 28/18/75/1 28/18/75/1 | 1 | 0.44 |
| 4 | BA/MMA/ST/DBV = 24/15/81/1 | 2 | 0.44 |
| 5 | BA/MMA/ST/DBV = 24/15/81/1 | ½ | 0.42 |
| Comparative Example | | | |
| 1 | BA/MMA/ST = 37/23/100 | 0 | 0.27 |
| 2 | BA/MMA/ST/EGDMA = 28/18/75/1 | 0 | 0.29 |
| 3 | BA/MMA/ST/DBV = 24/15/81/1 | 0 | 0.27 |
| 4 | ST = 121 | 0 | 0.21 |
| 5 | ST = 363 | 0 | 0.19 |

[1])Parts by weight based on 100 parts of solid polymer after the firstshell-forming stage.
[2])The first order means a linear change in concentration. The second order indicates a convex-type change, one halves a concave-type change, and a zeroth no change in compositional content.
[3])BA: Butylacrylate, MMA: Methyl methacrylate, ST: Styrene, DVB: Divinyl benzene EGDMA: Ethylene glycol dimethacrylate
[4])Kubelka-Munk scattering coefficient per unit film of thickness 1 mil

APPLICATION EXAMPLE 2

For a practical comparison of opacifying effectiveness, typical white-colored latex paints were prepared according to the following paint formulation, in which part of TiO$_2$ was replaced by the core/shell polymer particles. The paints were adjusted to have viscosity of 80±5 KU, pigment volume concentration (PVC) of 72.5%, and solid volume ratio (SVR) of 33%.

| Raw Materials | Parts by Weight |
|---|---|
| Deionized water | 17.0 |
| Sequestering agent: 10% Aq. soln of sodium hexamethaphosphate | 3.0 |
| Pinment dispersant: Orothan 731 (Rohn and Hass Co.) | 0.1 |
| Pigment wetting agent: Trition CF-10 (ROHM AND HAAS CO.) | 0.3 |
| Preservative: Floxal XL-2 (ICI CO.) | 0.2 |
| Antifoamer: Nopoco-NXZ (SANOPCO CO.) | 0.2 |
| Thickner: 3% Aq. soln of Natrosol (HERCULES CO.) | 12.3 |
| PH adjuster: 20% ammonia | 0.2 |
| Freeze-thaw stabilizer: Ethylene glycol | 2.0 |
| Pigment: | |
| Talc 325 | 8.0 |
| Calcium carbonate 1000 | 13.0 |
| Titanium dioxide | 10.0 |
| Alsilate W | 14.0 |

The above ingredients were ground at high speed for 30 minutes and let down at slower speed with the addition of the following ingredients.

TABLE I

| Coalesoing agent: Texanol | 0.3 |
|---|---|
| Binder: H5250 (Korea Chemical Co.) | 14.2 |
| A Swollen Core/Shell Polymer Dispersion | 6.0 |

The paints were applied on an opacity chart (The Lenete Co., Form 2B) using a Bird applicator with wet film thicknesses of 4 mil and 6 mil and dried at least one day at room temperature. The contrast ratios of paints were measured by the method KSM 5345. The results were given in Table II.

| | Contrast Ratio | |
|---|---|---|
| | 4 mil | 6 mil |
| Example | | |
| 1 | 0.942 | 0.970 |
| 2 | 0.946 | 0.973 |
| 3 | 0.946 | 0.977 |
| 4 | 0.941 | 0.971 |
| 5 | 0.943 | 0.973 |
| Comparative Example | | |
| 1 | 0.932 | 0.961 |
| 2 | 0.933 | 0.961 |
| 3 | 0.929 | 0.964 |
| 4 | 0.926 | 0.959 |
| 5 | 0.928 | 0.954 |

We claim:
1. A process for making an aqueous dispersion of non-film forming core-shell emulsion polymer particles, comprising:
(1) preparing a core by polymerizing 15 to 60% by weight carboxylic acid monomers with 39 to 85% by weight other monoethylenically unsaturated monomers and 0 to about 2% by weight of a crosslinkable monomer,
(2) encapsulating said core with a rigid polymer shell by polymerizing shell-forming monomers consisting of 95 to 100% by weight of at least one monethylenically unsaturated monomer and 0 to 5% by weight of acid monomers in the presence of said core particles in a polymerization zone, said shell-forming monomers being fed in such a manner that the compositional contents of shell-forming monomers entering the polymerization zone are changing gradually throughout the period of monomer feed by a method wherein at least two feed tanks containing different initial monomer mixtures are connected in a row with a reactor, at least one feed tank being arranged near the reactor and at least one feed tank being arranged far from the reactor, monomer mixture from the at least one near tank being fed directly to the reactor and simultaneously, monomer mixture of the at least one far tank being fed directly into the at least one near tank, wherein the at least one near tank has a continual variation in com- positional content of monomers therein and the reactor has a continual variation in the compositional content of monomers fed thereto, and (3) neutralizing the polymerized carboxylic acid monomers in said core with base so as to swell said core and form particles which, when dried, contain at least one void.

2. A process according to claim 1, in which the shell polmer is made in a single stage or in a plurality of stages of emulsion polymerization.

3. A process according to claim 2, wherein the neutralization by introducing base is carried out either after forming an outermost shell or between shell-forming stages.

4. A process according to claim 1, wherein the core polymer is made in a single-stage process or in a multi-stage process including a seed forming stage.

5. A process according to claim 1, wherein multifunctional crosslinking monomers are added during outermost-shell formation to provide a crosslinking density gradient in said shell layer.

6. A process according to claim 5, wherein the crosslinking monomer is selected from the group consisting of divinyl benzene, allyl (meth) acrylate, tripropylene glycol di(meth)acrylate, diethylene glycol di(meth)acrylate, ethylene glycol di(meth)acrylate, 1,6-hexanediol di(meth) acrylate, 1,3-butylene glycol di(meth)acrylate, and trimethylolpropane tri(meth)acrylate and mixtures thereof.

7. A process according to claim 1 in which the ratio of the weight of the core to the weight of the shell is from about 1:1 to 1:100.

8. A process according to claim 1 in which the said core/shell particles has an average particle diameter in the range of 0.1 to 0.5 micron in unswollen condition.

9. An aqueous dispersion of composite polymer produced by the process of claim 1, wherein an average particle diameter is from 0.1 to 2.0 micron and a diameter of void formed when dried is from 0.05 to 1.5 micron.

10. A coating or impregnating composition which comprises the said core shell particles produced by the process of claim 1.

11. A coating or molding product which is made from a composition prepared by the process according to claim 10.

12. A process for making an aqueous dispersion of non-film forming core-shell emulsion polymer particles, comprising:

preparing a core by polymerizing from about 15 to about 60% by weight carboxylic acid monomers with from about 39 to about 85% by weight other monoethylenically unsaturated monomers and from 0 to about 2% by weight of a crosslinkable monomer, encapsulating said core with a rigid polymer shell by polymerizing shell-forming monomers consisting of from about 95 to about 100% by weight of at least one monoethylenically unsaturated monomer and from 0 to about 5% by weight of acid monomers in the presence of said core particles to form a core-shell polymer, neutralizing the polymerized carboxylic acid monomers in said core with base so as to swell said core and form particles which, when dried, contain at least one void, and further encapsulating said core-shell polymer with at least one additional shell by polymerizing the same or other shell-forming monomers consisting of from about 95 to about 100% by weight of at least one monoethylenically unsaturated monomer and from 0 to about 5% by weight of acid monomers in the presence of said shell-core particles to form a core-shell, said shell-forming monomers being fed in such a manner that the compositional contents of shell-forming monomers entering the polymerization zone change gradually throughout the period of monomer feed by a method wherein at least two feed tanks containing different initial monomer mixtures are connected in a row with a reactor, at least one feed tank being arranged near the reactor and at least one feed tank being arranged far from the reactor, the monomer mixture from the at least one near tank being fed directly to the reactor and simultaneously, the monomer mixture of the at least one far tank being fed directly into the at least one near tank, wherein the at least one near tank has a continual variation in compositional content of monomers therein and the reactor has a continual variation in the compositional content of monomers fed thereto.

* * * * *